Feb. 19, 1957  S. W. FAIRWEATHER  2,781,643
APPARATUS FOR REFRIGERATING FOODSTUFFS
Filed Jan. 19, 1953  3 Sheets-Sheet 1

INVENTOR
S. W. FAIRWEATHER
By Fetherstonhaugh & Co.
ATTORNEYS

INVENTOR
S. W. FAIRWEATHER
By Featherstonhaugh & Co.
ATTORNEYS

Feb. 19, 1957  S. W. FAIRWEATHER  2,781,643
APPARATUS FOR REFRIGERATING FOODSTUFFS
Filed Jan. 19, 1953  3 Sheets-Sheet 3

INVENTOR
S. W. FAIRWEATHER
By Featherstonhaugh & Co
ATTORNEYS

United States Patent Office 2,781,643
Patented Feb. 19, 1957

2,781,643
APPARATUS FOR REFRIGERATING FOODSTUFFS
Starr W. Fairweather, Montreal West, Quebec, Canada Application January 19, 1953, Serial No. 331,768

4 Claims. (Cl. 62—87)

This invention relates to method and apparatus for refrigerating perishable foodstuffs at suitable keeping temperatures over extended periods of time so as to retard deterioration or spoilage of such foodstuffs during storage and transportation.

The problem of storing and shipping large quantities of foodstuffs requiring the same keeping temperature has been solved by the use of cold storage plants and refrigerator cars or vehicles equipped for maintaining a specified temperature. However, in the shipment of small quantities, particularly by railway transportation, it frequently happens that these small shipments must be placed in station facilities not equipped with refrigeration to await rail transportation. Frequently, too, the railways cannot allot a refrigerator car for the keeping of a small quantity of foodstuff at a specified temperature without rendering the cost of transportation prohibitive. Therefore, the usual practice has been to pack the foodstuff in containers with ice. This is accomplished by lining a container with ice and packing the foodstuff therein as well as distributing ice between the foodstuff. If the container is insulated against atmospheric temperatures the problem arises of disposal of the water during the ice melting process, particularly when the ice is in direct contact with the foodstuff or the packages containing same. In order to ensure adequate drainage, insulation of the container against atmospheric temperatures must be sacrificed so that the ice must perform the multiple function of absorbing the heat from without and from within as well as maintain the foodstuff at or as near to as possible the melting point of ice. The result is, that over a sustained period of time, the ice around the sides of the foodstuff dissipates allowing the foodstuffs to absorb the atmospheric temperatures even although in some cases ice in the centre has not been completely dissipated. This exposure reduces the keeping time of the foodstuffs even to the extent of spoiling a considerable amount of the shipment.

Experiments have been made at packaging the foodstuffs in Dry Ice but this is accompanied by hard freezing of the foodstuffs. However, certain perishable foodstuffs cannot withstand hard freezing without deterioration. Then too, in most areas the food laws require the labeling of frozen foods as such. This usually has an adverse effect on the market value of the foodstuffs.

A particular object of this invention, therefore, is to provide a method of packing perishable foodstuffs and like commodities which comprises fabricating a portable insulating screen containing an eutectic mixture having a predetermined eutectic temperature, subjecting the screen to a prefreezing operation to impart to the mixture contained therein a predetermined heat absorbing capacity and then insulating said foodstuffs with said prefrozen screen to impart to said foodstuffs a keeping temperature predetermined by the eutectic temperature of said mixture for a predetermined period of time.

Another object is to provide a method of packing perishable foodstuffs in an insulating screen of an eutectic mixture of the character described so as to enable the temperature of the foodstuff to be reduced to and maintained, for a predetermined period of time, at a keeping temperature governed by the eutectic temperature of said mixture and its predetermined capacity for absorbing heat from said foodstuffs.

A further object is to provide an apparatus for maintaining foodstuffs at a predetermined temperature which comprises a double-walled, insulated container and a plurality of liner or screen sections receivable in said container for completely insulating foodstuffs when packed in the container, said liner or screen sections containing an eutectic mixture of a predetermined eutectic temperature and frozen to a degree calculated to maintain said foodstuff at a predetermined keeping temperature for a predetermined period of time.

Still another object is to provide a novel arrangement of the screen sections with respect to the foodstuffs and the container therefor to ensure the maximum insulation value.

The above and other objects and characteristic features of this invention may be understood more fully by reference to the following detailed description, taken in connection with the accompanying drawings, in which.

Figure 1:
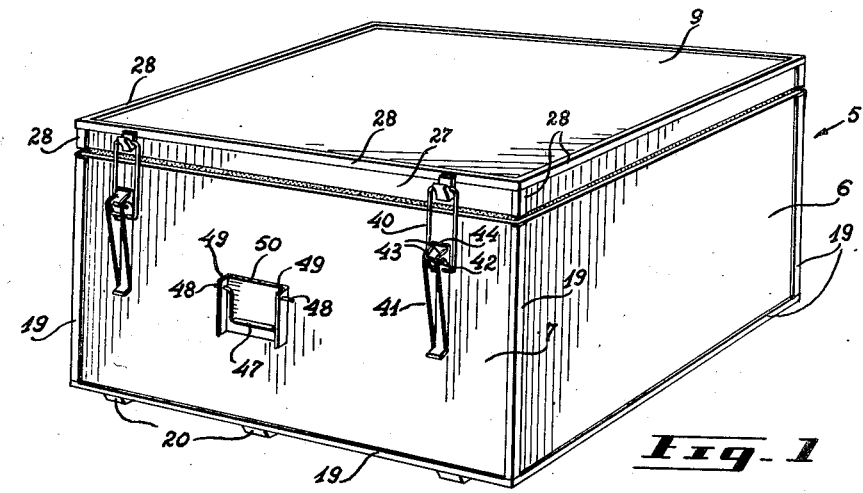
Fig. 1 is a perspective view of a container embodying my invention.
Figure 2:
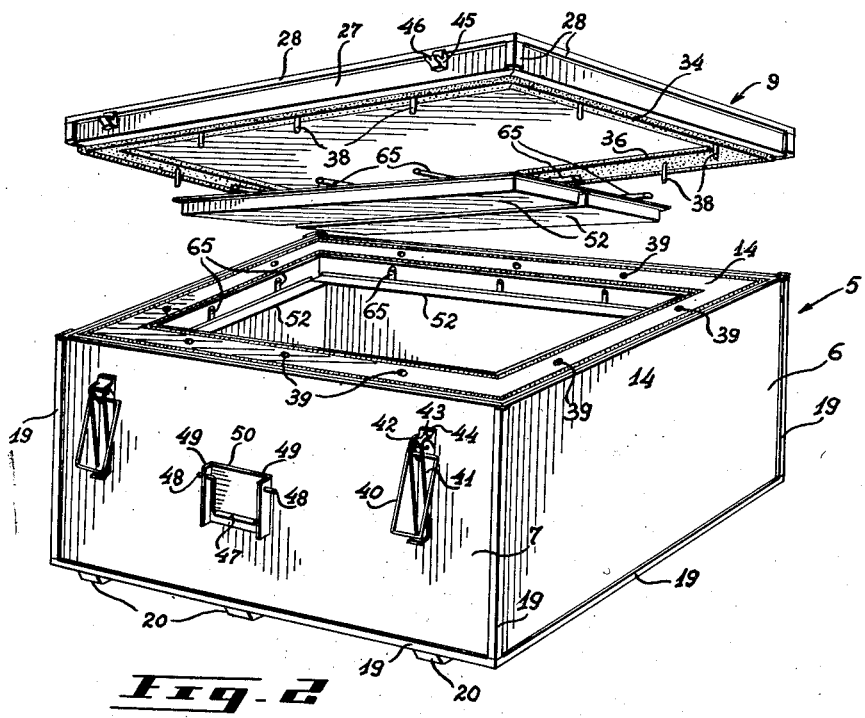
Fig. 2 is a perspective view of a container showing the cover and certain other elements removed.
Figure 3:
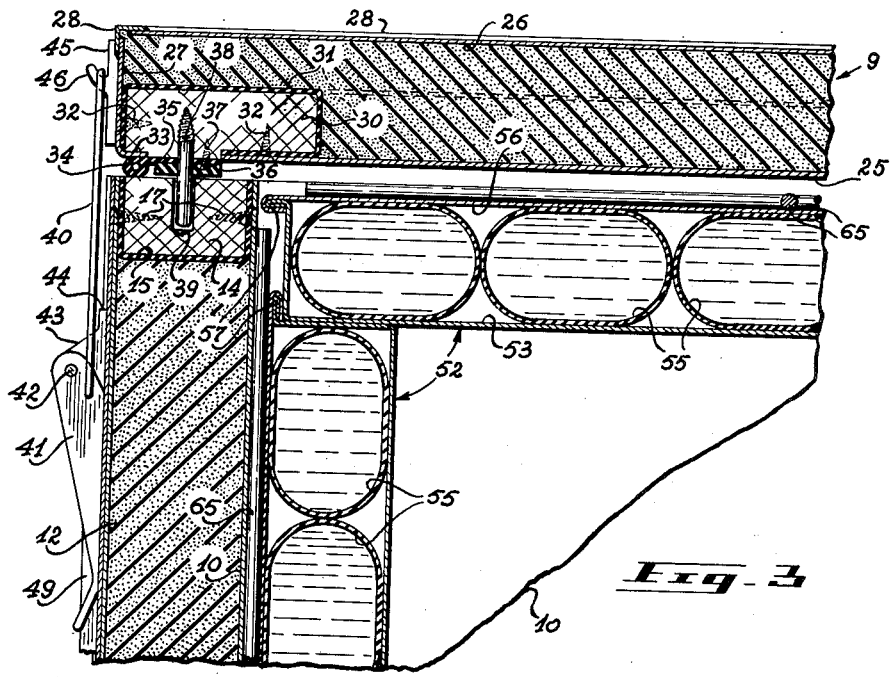
Fig. 3 is a fragmentary view in section of a container.
Figure 4:
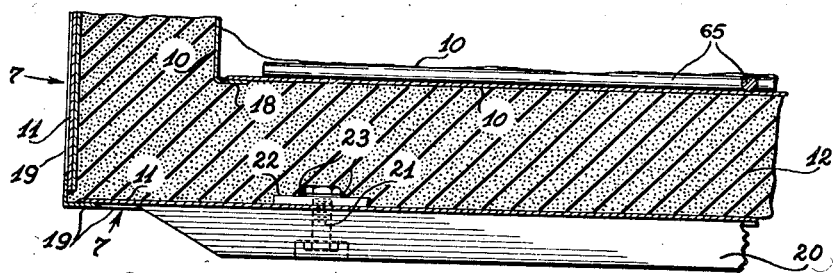
Fig. 4 is another fragmentary detail view (enlarged) of a container with the screens in place.
Figure 4:
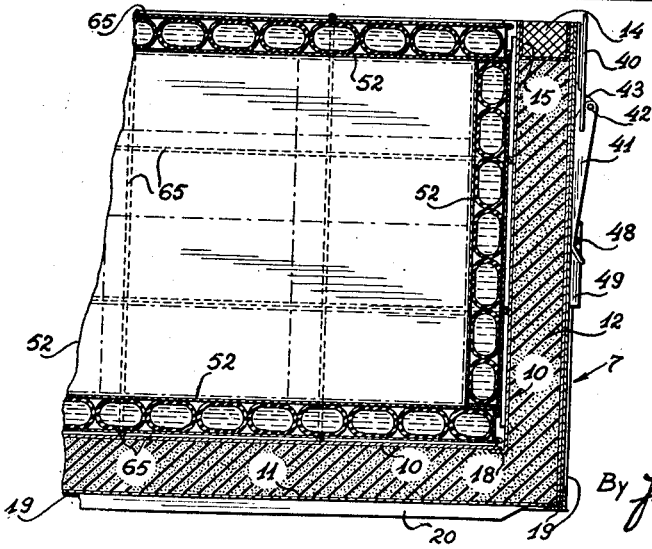

Referring more particularly to the drawings, 5 designates a container for shipment of perishable foods including side, end and bottom walls 6, 7 and 8 respectively, and a removal cover 9. The walls are composed of spaced inner and outer panels 10 and 11, preferably of aluminum or other suitable lightweight sheet material and an insulating filler 12 therebetween. The inner wall panels 10 are held in spaced relation to outer wall panels 11 by spacers 14 lined on their side and bottom surfaces by a sealing strip 15. Spacers 14 are arranged to extend between panels 10 and 11 of said container with their upper surfaces flush with the upper edge of the container and the panels are secured to the opposing sides of the spacers by screws 17 or other suitable means. The meeting edges of inner wall panels 10 are lapped and welded as indicated at 18. The meeting edges of outer wall panels 11 are welded to reinforcing corner members 19. Runners 20 are secured to the under side of bottom wall 8 by bolts 21. A reinforcing plate 22 welded to the inner surface of the bottom wall outer panel 11 is provided with bolt openings registering with corresponding openings in bottom wall panel 11 and runner 20 through which bolt 21 extends. The head of the bolt is welded all around, as indicated at 23, to seal off the openings so as to prevent temperature leakage through the bottom wall 8. The welded joints of the inner and outer wall panels 10 and 11 also serve to prevent heat leakages through the walls of the container.

Cover 9 is also formed of spaced inner and outer wall panels designated 25 and 26 respectively, as well as outer side wall panels 27. Panels 26 and 27 are welded along their meeting edges to reinforcing corner members 28. A suitable insulating material fills the space between panels 25, 26 and 27. A rectangular frame 30 substantially covered by a rubber sealing strip 31 supports the inner and side wall panels 25 and 27 which are secured to the frame by screws or other suitable securing means 32. A marginal portion of side wall panel 27 is bent inwardly to lie along the bottom of frame 30 with its outer surface flush with the surface of the frame as indicated at 33. A tubular gasket 34 having a securing flange 35 is fastened to the under side of frame 30 with the tubular portion 34 overlapping the inturned marginal portion 33 of side wall panel 27. The gasket flange 35 is secured along the length of each side section of frame 30 by means of a rubber sealing strip 36 superimposed thereon and spaced screws 37 extending through strip 36 and flange 35 and into the frame 30.

When the cover 9 is placed over the container, sealing strip 36 and gasket 34 bear against the upper surface of spacers 14. Centering pins 38 which project from the frame 30 are receivable in recesses 39 provided in the spacers 14. The cover is securely compressed against the upper surface of container 5 by means of suitable clamps at opposite ends of the container. The clamps comprise a clamping ring 40 pivotally mounted on a clamping lever 41 being pivoted at one end, as indicated at 42, on a pair of brackets 43 projecting from a plate 44 secured to the outer surface of an end wall 7. The corresponding end wall 27 of the cover has a plate 45 provided with an upturned tongue 46 about which the free end of ring 40 is looped when lever 41 is raised. The ring mounting is eccentric to the pivot 42 of lever 41 so that lowering of said lever exerts a downward pull on tongue 46 to clamp the cover 9 against the upper surface of container 5. The end walls 7 are also provided with bail shaped carrying handles 47 pivotally mounted, as indicated at 48, in outwardly projecting side arms 49 of a base plate 50 secured to the outer surface of said end walls.

In order to preserve perishable foodstuffs, and the like, the interior of the container is lined with a plurality of insulating screens or liners 52 along the bottom, side and end walls of the container. When the foodstuffs are packed in the container, additional screens are placed thereover before the cover 9 is put on and secured. Each screen or liner comprises an outer shell 53 defined by bottom, side, and end walls with marginal flanges 54 projecting outwardly from the upper ends of the side and end walls, one or more lengths of flexible tubing 55 filled with an eutectic mixture and arranged in said shell from end-to-end in side-by-side relation, and a cover plate 56 which is fitted over the shell 53 and secured thereto by folding over the marginal edges of the cover with adjacent marginal portions of the flanges 54, as indicated at 57.

Figures 5, 6:
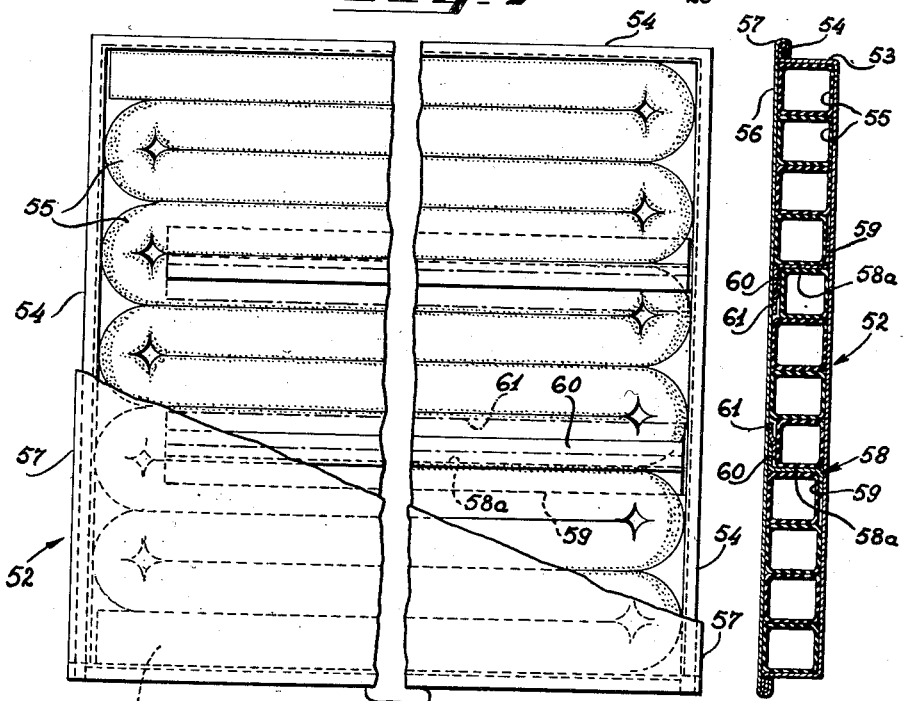
Fig. 5 is a top plan view of a hollow screen or liner forming slab embodying my invention, a portion of the slab cover having been broken away for sake of clarity.
Fig. 6 is a sectional view of the slab shown in Fig. 5.

Preferably the tubing 55 is of a single length and a diameter which may be fitted in the shell 53 to substantially fill the same by folding the tube at each end of the shell so that each folded section will lie along the full length of the shell in side-by-side relation to adjacent sections, as shown in Figs. 5 and 6. It will be seen that these tubular sections are compactly arranged within the shell to substantially fill the same. Any unfilled space, however, will be completely filled by expansion of the flexible tubing during the freezing and resultant expansion of the eutectic mixture. The shell 53 may also be provided with longitudinally extending guide members 58 which are secured along the bottom wall of the shell. As shown in the accompanying drawings the guide members 58 are shaped to provide to vertically disposed web 58a, a flange 59 on one side of said web and at right-angles thereto, which flange is secured to the inner surface of the shell bottom wall, and a second flange 60 on the opposite side of the web and at right-angles thereto. The inner surface of cover plate 56 is provided with longitudinally extending guide rails 61 spaced from the cover along one side thereof for slidably fitting the flanges 60 between the cover and said rails. The guide members 58 are spaced inwardly from at least one end wall of the shell to permit folding of the tube therearound. The interlocking arrangement of the guide members with the cover, as well as the securing of the guide members to the bottom wall of the shell, serves to prevent bulging of the cover and bottom wall during freezing and expansion of the eutectic mixture.

The screens or liners 52 may each be of a size to individually cover each surface with suitable differences to provide interfitting. However, it is preferred to provide screens which will be for the most part interchangeable. Thus, for example, in a rectangular container having a compartment of a depth equal to one half of the width, it is feasible to provide six screens of equal length and breadth and two screens, each of a length equal to the distance between the opposing side wall screens. It is also preferable to provide spacers between the inner surfaces of the container and the adjacent surfaces of the screens. These spacers may be in the form of removable grills 65. As an alternative, bars may be secured either along the surface of the screen cover 56 or along the defining walls of the compartment. However, a removable grill 65 facilitates the cleansing of both the compartment and screens.

The proceedure for setting up the lining in the campartment is as follows: First the grills are placed on the bottom of the container and around the sides and ends. Any two of the longer screens are then placed lengthwise of the compartment with their covers 56 in contact with the bottom grill 65. A long screen is then placed along each side wall with its cover 56 against a grill 65 and the rolled edge 57 overlapping the adjacent screen on the bottom of the compartment. A short screen is similarly placed along each end wall of the compartment between the opposing side wall screens and with the rolled edges 57 lapping the ends of said side and bottom wall screens. This provides a non-collapsible set-up of the screens within the compartment. The remaining space in the compartment can then be filled with foodstuffs or other commodities and then the two remaining long screens are placed on top so as to lie between the rolled edges of the side and end wall screens. A grill is placed on top and the cover is fitted thereover and clamped on as previously described.

The eutectic mixture in the screens may be in the form of a salt in aqueous solution, for example, sodium sulphate, sodium chloride, sodium nitrate, sodium thiosulphate, etc. The composition of the eutectic mixture depends on the temperature at which the perishable foodstuffs are to be kept. It is proposed to pack fish, meats, vegetables and fruits in the containers, all requiring different keeping temperatures. Experiments have been carried out for the packing and keeping of fish.

It is well known that fish, when maintained at certain temperatures, will keep for specified times before the bacterial count has reached the spoilage stage. Experiments have consistently shown the following temperatures and keeping times of fish to be:

| Storage temperature, ° F.: | Keeping time, days |
|---|---|
| 31.5 | 11–12 |
| 33 | 6–8 |
| 37 | 5–6 |
| 45 | 2–3 |

By careful experiment it has been found that an even lower temperature, which will not result in freezing of the fish, produces more satisfactory keeping results. In this connection it was found that a temperature of approximately 29° F. provided a highly satisfactory keeping temperature without endangering the quality of the fish by excessive cooling.

In order to maintain fish in the container at about this temperature the aqueous solution must be in proportions which will have a melting point or eutectic temperature of approximately 29° F. In a specific test for the keeping of fish the eutectic mixture employed was an aqueous solution of sodium sulphate 3.8%, calculated to produce an eutectic temperature of 29½° F. It will be obvious, however, that lower or higher eutectic temperatures may be produced by increasing or decreasing the proportion of sodium sulphate accordingly. Similarly, in the use of other salts, the proportion of the salt employed in the aqueous solution will determine the eutectic temperature of an eutectic mixture.

An experiment was conducted to ascertain the ability of the container to maintain the temperature of fish which has been precooled to 29° F. On May 17, 1952, the fish was filleted and packed in wooden boxes by a packing company in Halifax, Nova Scotia. The temperature of the fish at that time was 55° F. Eighty pounds of the packed fish were then placed in a cold room and allowed to cool down to temperatures ranging between 29° and 30° F. The fish was then placed in another room at 29° F. for a period in an effort to equalize the temperatures of the whole shipment.

Additionally the screens or liners 52 containing an aqueous solution of 3.8% sodium sulphate were placed in a cold room for 14 hours at 12° F. to ensure total freezing of the eutectic mixture. The time and temperature here specified for freezing the mixture in the screens is unimportant. It is necessary thoroughly to freeze the eutectic mixture and as long as this is accomplished in the time available the temperature at which it is done is immaterial. It is inadvisable, however, to freeze the eutectic much below 10° F. Most of the heat absorbing capacity of the eutectic mixture is due to the melting process.

Prior to packing the fish in the container, thermometer bulbs were inserted through holes in the wooden boxes to a depth of approximately 1½ inches into the fish contained therein so that temperature readings could be taken of the fish when in the container at the top, centre, bottom and sides while the container was sealed during transit.

The container was packed on May 17 at 5.15 p. m., Atlantic time, with the screens or liners and the boxes of filleted fish, then sealed at 5.30 p. m. and placed in a baggage room at a temperature of approximately 70° F., to await shipment at 8.45 a. m. May 18 by train to Montreal. The shipment reached Montreal at 8.56 a. m. May 19, was unloaded and the container was finally opened after temperature readings had been taken at 9.05 a. m. E. S. T.

The following table shows the temperatures of the fish in the container from the time it was packed until just prior to unloading of the container.

| Date And Time Of Observation | Top, °F. | Center, °F. | Bottom, °F. | Side, °F. |
|---|---|---|---|---|
| May 17, 5.48 p. m. | 29.5 | 29.5 | 29.0 | 30.0 |
| May 17, 8.15 p. m. | 29.5 | 29.5 | 29.0 | 29.5 |
| May 17, 10.04 p. m. | 29.5 | 29.5 | 29.0 | 29.5 |
| May 18, 7.38 a. m. | 29.5 | 29.5 | 29.0 | 29.5 |
| May 18, 10.32 a. m. | 29.5 | 30.5 | 29.0 | 29.5 |
| May 18, 12.14 p. m. | 29.5 | 30.5 | 29.0 | 29.5 |
| May 18, 2.05 p. m. | 31.0 | 31.0 | 29.5 | 30.0 |
| May 18, 3.05 p. m. | 31.0 | 31.5 | 30.5 | 30.5 |
| May 18, 4.08 p. m. | 31.0 | 31.5 | 30.5 | 30.5 |
| May 18, 5.01 p. m. | 31.0 | 31.5 | 30.5 | 30.5 |
| May 18, 6.03 p. m. | 31.0 | 31.0 | 30.5 | 30.5 |
| May 18, 7.17 p. m. | 31.0 | 31.0 | 30.0 | 30.0 |
| May 18, 8.13 p. m. | 30.5 | 31.0 | 30.0 | 30.0 |
| May 18, 9.17 p. m. | 30.5 | 31.0 | 30.0 | 30.0 |
| May 18, 10.26 p. m. | 30.5 | 30.5 | 30.0 | 30.0 |
| May 19, 4.37 a. m. | 30.5 | 31.0 | 30.0 | 30.0 |
| May 19, 7.43 a. m. | 30.5 | 31.0 | 30.0 | 30.0 |
| May 19, 8.41 a. m. | 30.5 | 31.0 | 30.0 | 30.0 |
| May 19, 9.05 a. m. | 30.5 | 31.0 | 30.0 | 30.0 |
| Temp. Rise | 1 | 1½ | 1 | 0 |

Total time=41 hrs. 17 mins. (Including adjustment between Atlantic and Eastern Time Zones).

It will be noted that the temperatures remained substantially constant from 5.48 p. m. on May 17, until 12.14 p. m. on May 18 except for a rise of 1% at the centre thermometer. This is attributed to its remote position from the screens. It will be noted, also, that a general rise was recorded at 2.05 p. m. on May 18. However, since the rise in temperature was at least partially recovered by the action of the eutectic mixture in all cases by a lowering of the temperatures, it is assumed that the cover of the container had been removed by some unauthorized person and then replaced sometime between 12.14 p. m. and 2.05 p. m. The fish was kept in the container for more than 40 hours in transit with only a relatively small rise in temperatures. The overall rise in temperature throughout the experiment, with exception to the unaccounted for temporary rise, was as follows:

| | ° F. |
|---|---|
| Top of container | 1 |
| Centre of container | 1½ |
| Bottom of container | 1 |
| Sides of container | 0 |

The average temperature was kept well below 31.5° F. for more than 40 hours at an average outside temperature of 70° F.

Figure 7:
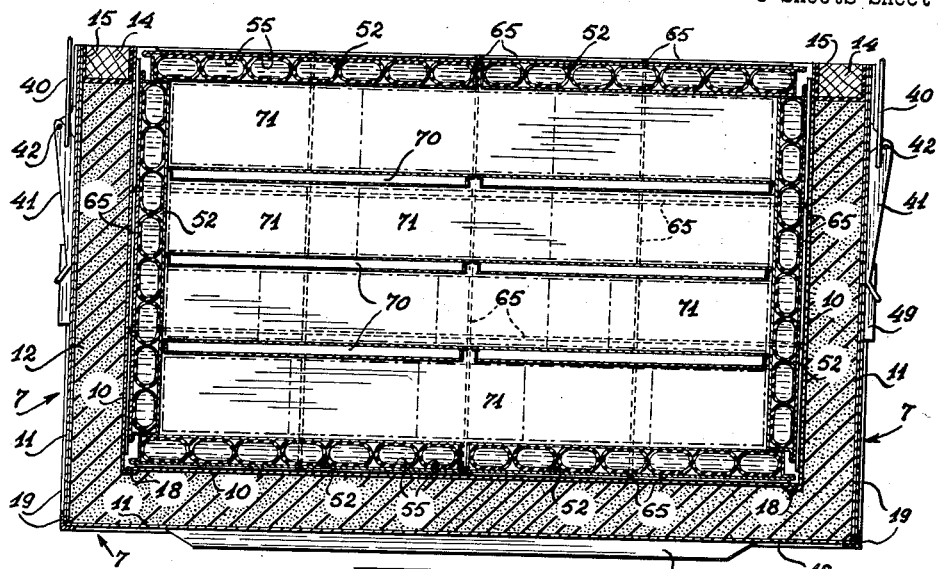
Fig. 7 is a vertical sectional view showing a modified assembly of my container.

Fig. 7 illustrates a modification of this invention which comprises the introduction of cooling plates 70 between the boxes 71. This enables cooling of the foodstuffs at points remote from the screens or liners 52 which are located adjacent the inner surfaces of the container. The cooling plates are similar in construction to the screens 52, being filled with flexible tubing containing an eutectic mixture. The plates 70 are preferably thinner than the screens 52 since they are not intended to form a protective liner between the walls of the container and the foodstuff packed in the container.

With this modified arrangement the centre of the foodstuff will be cooled by the action of the cooling plates 70 and thus prevent the rise in temperature noted in the experiment heretofore described.

Another object of the modified form of the invention is to enable the shipment of commodities without resorting to the precooling of these commodities before packing in the container. In order to determine its feasibility an experiment was carried out between June 14th and 16th, 1952. Prior to the packing of the foodstuffs, the screens 52 and cooling plates 70 were placed on the cooling coils of a cold storage room for a period of 24 hours. The temperature of the room where the screens and plates were frozen varied between 8° and 2° F. during that period.

Twelve waxed container boxes were packed with cod fillets totalling 100½ lbs. gross, without previously cooling the fish. Thermometers were installed in the packaged fish so that temperature readings could be taken from the top center, bottom and the upper side edges of the fish when the latter was packed in the container. The screens 52 were then placed about the inside of the container to serve as a liner and the boxes of fish were packed in the container placing the cooling plates 70 between layers of the boxes, substantially as shown in Fig. 7 so as to ensure the cooling of the fish at the central portion of the container. The container was then sealed and the first temperature reading was taken at 9.57 a. m. on June 14, 1952, and successive readings were taken at intervals for a period of 47½ hours as shown in the following table:

| Time of Observation | Upper side edge, °F. | Top, °F. | Centre, °F. | Bottom, °F. |
|---|---|---|---|---|
| 0 hrs | 45 | 45 | 44 | 43 |
| 2 hrs | 42 | 42 | 41 | 38 |
| 3 hrs | 41 | 41 | 41 | 37 |
| 4 hrs | 38 | 38 | 37 | 34 |
| 6 hrs | 37 | 36 | 35 | 31½ |
| 8 hrs | 35½ | 35 | 33½ | 31½ |
| 10 hrs | 34 | 34 | 32 | 30½ |
| 12 hrs | 32½ | 33 | 31 | 30½ |
| 21 hrs | 29½ | 30½ | 28 | 30½ |
| 24 hrs | 30 | 30½ | 29 | 31 |
| 27 hrs | 31 | 31 | 30 | 31½ |
| 33 hrs | 32 | 31½ | 30 | 32½ |
| 36 hrs | 33 | 31½ | 31 | 34 |
| 38 hrs | 33½ | 32½ | 31½ | 34½ |
| 45 hrs | 36 | 34½ | 34 | 36 |
| 47½ hrs | 37 | 35 | 35 | 37 |

The fish was packed at a warehouse in Halifax and sealed at 9.57 a. m. June 14. Then three hours later was moved by truck to a baggage room to await transportation by train, 10 hours from packing time, for shipment to Montreal. The above table shows a gradual reduction in temperature throughout the container for the first three hours, a marked reduction between the third and fourth hours and then a continuous gradual cooling until the twenty-first hour followed by a gradual, substantially uniform increase in temperature for the remainder of the journey. Upon arrival at Montreal the fish in the waxed boxes weighed 99¾ lbs. indicating a shrinkage of ¾ pound in approximately 48 hours. The rapid reduction in temperature between the third and fourth hours was attributed to agitation of the eutectic mixture during transit from warehouse to baggage room. It is also thought that the gradual increase in temperature after twenty-one hours was caused by excessive melting of the eutectic mixture in absorbing the heat from the fish. The gradual rise in temperature may have been caused, either by generation of the latent heat in the fish or by adsorption of heat through the container walls after the insulation value of the screens had been dissipated.

The above experiment, while not producing the desired results, clearly indicates the feasibility of cooling fish in the packed container to a desired keeping temperature for at least a substantial period of time during transit. This is accomplishable by lining the container with eutectic mixture containing screens or liners and inserting cooling plates between the packaged fish. The heat absorption capacity of the screens and cooling plates must also be increased to absorb the extra heat from the fish and to maintain the desired low temperature once it has been reached.

Having now described what is believed to be the preferred embodiments of this invention it is to be understood that additional modifications may also be resorted to without departing from the scope and spirit of the invention as defined in the appended claims.

What I claim is:

1. Apparatus for packing foodstuffs requiring a specific keeping temperature, comprising a container including an outer wall structure defining side, end and bottom walls, an inner wall structure defining side, end and bottom walls nested within said outer wall structure with the defining walls of said inner structure in spaced relation to the corresponding defining walls of said outer structure, an insulated spacer block disposed between and secured to the upper marginal portions of said outer and inner structures so as to suspend said inner structure relative to said outer structure, an insulating filler disposed between the opposing surfaces of said outer and inner structure, an insulated top wall closure removably fitted over said container with marginal portions overlying said spacer block to define an air-tight compartment within said container, and a removable liner for said compartment comprising a plurality of separable hollow slabs disposed entirely about the defining walls of said compartment in spaced relation to the inner surfaces of said container and closure therefor, each of said liner slabs containing a sealed eutectic mixture of a predetermined strength which has been prefrozen to impart an eutectic temperature substantially equivalent to the keeping temperature of foodstuffs.

2. In an apparatus for packing foodstuffs requiring a specific temperature, including a portable container defining an air-tight compartment, a removable liner for said compartment said liner comprising a plurality of separable hollow slabs, each of said slabs comprising top, bottom and side walls, a plurality of expansible tubular sections disposed within said slab in side-by-side relation between two opposing sides of the slab and an eutectic mixture sealed within said tubular sections whereby freezing of said eutectic mixture expands the tubular sections to substantially fill the interior of said slab.

3. Apparatus as set forth in claim 2, in which said expansible tubular sections are formed from a single length of a tubular member folded upon itself to provide a plurality of lengths each extending from one side wall to the opposing side wall of the slab and in side-by-side relation to each other.

4. Apparatus as set forth in claim 2, in which said slabs are provided with flanges projecting outwardly therefrom in the plane of the top wall, said liner for the compartment being formed by separately interfitting the slabs about the compartment defining walls with marginal portions butted in overlapping relation to marginal portions of adjacent slabs at right-angles thereto and with the flanges of certain slabs lapping the marginal portion of others at right-angles thereto to prevent inward collapse of the liner.

References Cited in the file of this patent

UNITED STATES PATENTS

| | | |
|---|---|---|
| 2,504,911 | Whitecar | Apr. 18, 1950 |
| 2,513,004 | Cooley | June 27, 1950 |
| 2,570,415 | Williams et al. | Oct. 9, 1951 |
| 2,591,168 | Latham | Apr. 1, 1952 |

FOREIGN PATENTS

| | | |
|---|---|---|
| 845,048 | Germany | July 28, 1952 |